Oct. 2, 1951     H. SHOUB     2,569,499
WIRE-RESISTANCE GAUGE FOR MEASURING LARGE STRAINS
Filed June 8, 1949
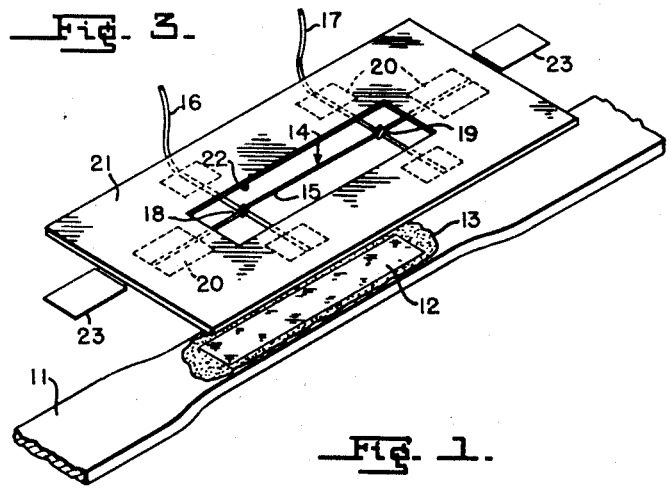
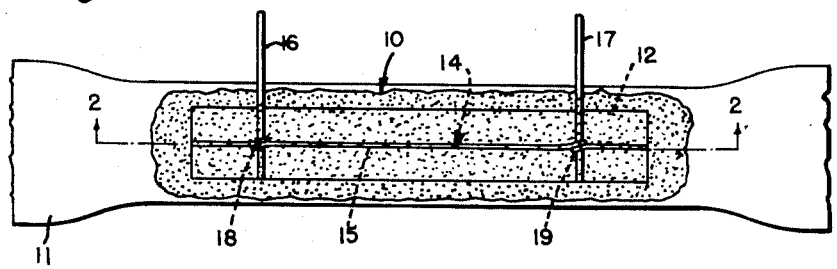
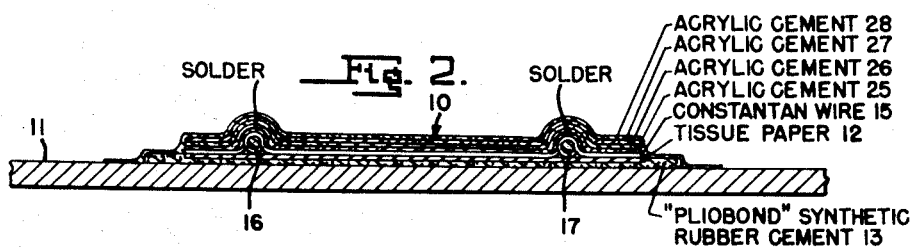
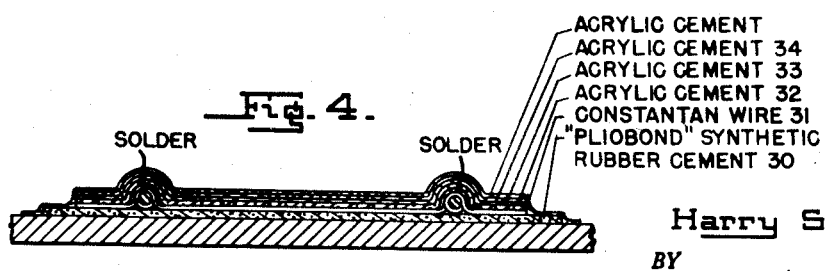
INVENTOR.
Harry Shoub
BY
M. Q. Hayes
ATTORNEY.

Patented Oct. 2, 1951

2,569,499

UNITED STATES PATENT OFFICE 2,569,499

WIRE-RESISTANCE GAUGE FOR MEASURING LARGE STRAINS

Harry Shoub, Washington, D. C., assignor to the United States of America as represented by the Secretary of the Navy Application June 8, 1949, Serial No. 97,870

4 Claims. (Cl. 201—63)

(Granted under the act of March 3, 1883, as amended April 30, 1928; 370 O. G. 757)

The invention relates to improvements in electric wire-resistance strain gages of the type which are cemented to a surface so that deformation of the surface will change the resistance of the gage.

Conventional wire-resistance strain gages are useful for the measurement of strain in the elastic range of steel and for small strains in the plastic range. Attempts have been made to use wire-resistance strain gages as measuring devices in the investigation of the properties of steel plates at loads great enough to cause large permanent strains. However, commercially available gages failed at strains above a few percent, whereas the steel plates under test elongated twenty percent or more prior to failure.

The primary object of the present invention is to provide an improved electric wire-resistance strain gage capable of measuring relatively large strains such as those in the plastic range of steel.

In my co-pending application Serial No. 40,414 filed July 23, 1948 (now Patent #2,536,101 issued January 2, 1951), a nylon-backed wire-resistance gage for measuring large strains is described and claimed but because of its lack of porosity this gage requires a relatively long drying time for securing it to a test surface.

An important object of the present invention is the provision of a wire-resistance plastic strain gage which may be bonded to a test surface in a comparatively short time.

Further objects are to provide a plastic strain gage that will have little or no effect on the structure to be tested and that is generally applicable in plasticity research.

Other objects and many of the attendant advantages of this invention will be readily appreciated as the same becomes better understood by reference to the following detailed description when considered in connection with the accompanying drawing wherein:

Fig. 1 is a top plan view of a preferred form of plastic strain gage assembled on a test specimen.

Fig. 2 is a central vertical longitudinal sectional view substantially on the line 2—2 of Fig. 1.

Fig. 3 is an exploded perspective view illustrating one step in the assembly of the gage on a test surface.

Fig. 4 is a central vertical longitudinal sectional view of a modified form of plastic strain gage assembled on a test surface.

In the drawing similar reference characters denote corresponding parts throughout the views.

The components of electric wire-resistance strain gages include fine resistance wire, thin backing material, strong cement that adheres firmly to metal and terminals which permit electrical connection with the gage wire. Attempts to use commercial strain gages and preliminary experimental gages for the measurement of large strains showed that difficulties and failures could be expected with all of the ordinary component parts when they are subjected to large strains.

The wire is the basic element of the gage and therefore is the first component to be considered in the provision of a wire-resistance gage for plastic strains. Measurements can be made at all values of strain with a single calibration constant for the gage if the resistance element is a wire formed of an alloy such as Advance or Constantan containing approximately 40% nickel and 60% copper. Such wire exhibits uniformity of resistance-strain coefficient in the elastic and plastic ranges of elongation. Available samples of such wire, however, would not withstand strains exceeding 17% and often failed at strains of 14%. In contrast, a specially annealed Constantan wire could be elongated 18% to 22% before breaking.

The gage backing is a thin sheet of material serving as an insulating layer between the gage wire and the metal to which the gage is attached. The material must be thin, have good insulating properties, low strength and high ductility, and should form a smooth surface when cemented.

Commercial wire-resistance gages for measuring low strains ordinarily include paper as the backing material. In the assembly of a commercial gage the cement used for attaching the strain element to the paper adds considerably to its stiffness. The kind of paper previously used in commercial strain gages ruptures at approximately 3% strain, and its abrupt separation usually snaps the gage wire. Experiment shows, however, that if a thin sheet of soft porous tissue paper, such as facial cleansing tissue, is secured by a suitable cement to the test surface of the specimen, a suitable wire strain element cemented in place over the paper is not subject to rupture at small strains. A possible explanation is that the very weak paper is impregnated by the cement used to attach it to the test specimen. The cement holding the wire element then forms with little penetration a layer above the cement that has oozed through the paper. In such a circumstance, the tissue paper seems to shred gradually when elongated rather than tear suddenly when it has reached the limit of its extensibility.

In the assembly of a gage, the wire strain element is held to the backing material by a suitable adhesive. Also the backing material must be attached to the test surface by some compatible cement, not necessarily the same as that used to hold the strain wire. Requirements for a suitable cement are flexibility and ductility in addition to considerable strength and an ability to adhere to a backing material up to the maximum strain to which the material may be stretched. Also the cement should be air-drying as it is frequently impractical to cure thermosetting materials applied to large test specimens. Cements that dry in an irregular and lumpy film are unsuitable for attaching the wire to the backing material or the gage to the test specimen.

Tests of the adhesion and compatibility of various cements and backing materials were made by applying a small strip of the backing material to the test surface of a flat tensile specimen, using a cement that had proved ductile when tested as a dried film. The specimen was then pulled to strains of 20% to 30%, and observations were made of the adhesion of the backing material to the metal at several intermediate strains as well as at the maximum.

Various adhesives such as air-setting Bakelites, brushing and insulating lacquers, and cements with a natural rubber or a natural resin base were tested. Reasons for unsuitability varied but usually were related to weakness or excessive brittleness and lack of ductility. In the end pliobond, a synthetic rubber cement, was found to adhere strongly to metal and so was used as the bonding adhesive for cementing the tissue paper insulating strip on the specimen. An acrylic resin, acryloid B-7, proved superior to all other cements tested in its ability to hold the wire strain element firmly in place, possibly because its low surface tension allowed complete surrounding of the 1-mil wire. This resin is formed of methyl methacrylate.

The requirements for lead wires for making connections to the gage are low resistivity, low strength, high flexibility and small mass. Soft copper wire is of low strength and because of its low resistivity adds only insignificantly to the resistance of the gage. Small diameter wire, preferably number 36 or number 38, preserves the flexibility of the gage, allowing its use on a curved surface. And if the use of the gage is extended to dynamic measurement, it is desirable that the mass of the leads be as small as possible.

Referring to Figs. 1 and 2 of the drawing, the numeral 10 generally designates a preferred form of bonded electric wire-resistance gage for measuring strain in the plastic range of steel. The gage after application to the test specimen 11 requires only a few days' drying time, but some care is necessary in the process of assembly. As illustrated more particularly in Fig. 3, a small strip of soft porous tissue paper 12, preferably a single thickness of cleansing tissue, is first cemented to the test surface 11 with pliobond cement 13. The porous tissue allows rapid drying of the cement therethrough, 48 hours ordinarily being sufficient. The strain element 14 is prepared from a single length of 1-mil specially annealed constantan wire 15 by soldering two number 36 or number 38 soft copper leads 16, 17 at right angles to points 18, 19 at opposite end portions of the strain wire. Connecting the leads at right angles to the strain wire permits stretching of the strain wire uninfluenced by the leads. The strain wire has a resistance of about twenty-five ohms per inch and its length may be selected to meet the requirements of the area under test. The strain element 14 is fastened with cellulose tape 20 to a piece of cardboard 21 in which a hole 22 has been cut, as shown in Fig. 3. The cardboard and strain element are placed face down on the test site so that the strain wire 15 lies on the pre-affixed tissue paper 12. Several pieces of tape 23 may be used to hold the cardboard 21 in place. Three successive layers 25—27 of thin acryloid B-7 cement are then brushed over the wire and tissue paper through the hole in the cardboard, with a twelve to twenty-four hour interval between coats. When the third coat has thoroughly dried, the cardboard is cut away, taking care not to destroy the leads. A final coat 28 of acryloid cement is then applied over the entire area of the gage. This last coat air-dries quickly and the gage is ready for use.

The gage may be tested upon attachment to the test surface 11 by pulling the specimen in a suitable testing machine and taking readings of the gage wire length and resistance at small increments of strain.

With the aid of a traveling microscope, strain in the metal specimen may be determined by measuring the distance between two reference scratches placed on the tensile specimen adjacent the ends of the effective length of the strain wire. Increments in resistance of the gage wire resulting from increments in strain in the specimen may be measured with a suitable Wheatstone bridge until the gage fails.

Deviation of the gage response from the standard resistance-strain coefficient of the wire may arise from several causes. Principally, there is some slippage of the gage wire on the backing material and of the entire gage on the test specimen when the gage assembly is extended into the plastic region. Also, the gage wire thins as it elongates, possibly causing some separation of the strain element from the cement surrounding it.

Unsatisfactory bonds between a gage and the strained metal test surface to which it is applied show two types of cement failure. Some cements, such as cellulose base materials and the alkyds (Glyptals) separate cleanly from one or both of the bonded surfaces at quite small strains. More ductile cements with good adhesive properties, such as pliobond and acryloid B-7, remain bonded to the two surfaces, but exhibit such failures as occur by a shearing action within the cement layer.

The gage assembly shown in Fig. 4 is like the previously described assembly except that the tissue paper backing is omitted. A layer 30 of pliobond is first applied to the test surface and allowed to dry. The strain wire 31 is then bonded to the pliobond layer by successively dried coats 32—34 of acryloid B-7 cement.

The gage assemblies described herein may be adapted to the measurement of large dynamic strains provided the leads are protected against violent motions. Sometimes, for instance under conditions of explosive loadings, the gage and its leads may receive transverse accelerations of such magnitude that the gage or the leads are torn loose.

The electric wire-resistance gages herein described, and particularly the type shown in Figure 4, are suitable for use in measuring large strains not only in metals but also in nonmetallic generally non-conducting materials such as plastics.

In the claims, the word "Pliobond" is used to mean butadiene-1, 3-acrylonitrile rubbery copolymer and phenol formaldehyde resin, with a conventional curing agent for the rubbery copolymer plus a solvent such as methyl ethyl ketone.

From the foregoing description it is evident that electric wire-resistance gages particularly valuable for measuring large strains have been provided and that these gages may be made ready for use on a test surface within a comparatively short time.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. A material test body to be subjected to large strains such as those in the plastic range of steel, said body having a test surface, a layer of elastic synthetic rubber cement adhered to said surface, said synthetic rubber cement consisting essentially of butadiene-1, 3-acrylonitrile rubbery copolymer and phenol formaldehyde resin and being selected for its capacity to stretch and retain its adherence to said surface while undergoing strains corresponding to those in the plastic range of steel, a constantan resistance filament selected for its capacity to stretch without failure under large strains, said filament lying on said cement layer, and a coat of acrylic resin cement adhered to said filament and to said layer, said coat of cement being stretchable and tenacious of said filament and said layer while undergoing strains corresponding to those in the plastic range of steel.

2. A material test body to be subjected to large strains such as those in the plastic range of steel, said body having a test surface, a layer of elastic cement adhered to said surface, a constantan wire filament lying on said cement layer, and a coat of acryloid cement adhered to said filament and to said layer, said elastic cement comprising butadiene-1, 3-acrylonitrile rubbery copolymer and phenol formaldehyde resin with a conventional curing agent for the copolymer and a solvent.

3. A material test body to be subjected to large strains such as those in the plastic range of steel, said body having a test surface, a layer of synthetic rubber cement adhered to said surface, said cement consisting essentially of butadiene-1, 3-acrylonitrile rubbery copolymer and phenol formaldehyde resin and being stretchable and tenacious of said surface while undergoing large strains, a thin sheet of soft porous tissue paper having negligible tensile strength embedded in said cement with said cement penetrating through said sheet, a wire resistance strain element formed of an alloy containing approximately 40 per cent nickel and 60 per cent copper, said strain element lying on said sheet, and at least one coat of cement bonding said filament and said sheet, said coat of cement being stretchable and tenacious of said filament and said sheet while undergoing large strains.

4. A material test body to be subjected to large strains such as those in the plastic range of steel, said body having a test surface, a layer of elastic cement adhered to said surface, said cement consisting essentially of butadiene-1, 3-acrylonitrile rubbery copolymer and phenol formaldehyde resin and being stretchable and tenacious of said surface while undergoing large strains, a thin sheet of soft porous tissue paper having negligible tensile strength embedded in said cement with said cement penetrating through said sheet, a constantan wire resistance strain element lying on said sheet, and at least one coat of acryloid cement formed from methyl methacrylate bonding said filament and said sheet, said cement coat being stretchable and tenacious of said filament and said sheet while undergoing large strains.

HARRY SHOUB.

REFERENCES CITED

The following references are of record in the file of this patent:

UNITED STATES PATENTS

| Number | Name | Date |
|---|---|---|
| 2,423,842 | McHenry | July 15, 1947 |
| 2,428,433 | Roy | Oct. 7, 1947 |
| 2,470,051 | Ruge | May 10, 1949 |

OTHER REFERENCES

DeForest, N. A. C. A. Technical Note #744, January 1940, pages 4 and 10.